United States Patent Office 3,431,302
Patented Mar. 4, 1969

3,431,302
CINNAMIC ACID DERIVATIVES
Carter N. Brown, Indianapolis, Ind., assignor to Eli Lilly and Company, Indianapolis, Ind., a corporation of Indiana
No Drawing. Filed Sept. 2, 1965, Ser. No. 484,739
U.S. Cl. 260—559     3 Claims
Int. Cl. C07c 103/26; A61k 27/00

ABSTRACT OF THE DISCLOSURE

Novel N-alkyl-N-alkynyl cinnamamides and methods of preparation thereof, having utility as neurosedatives.

---

This invention relates to new derivatives of cinnamic acid, in particular to certain unsaturated amides thereof useful for the alleviation of human mental disorders, and in the calming of animals in veterinary practice.

The compounds of this invention can be represented by the formula:

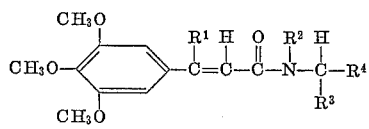

wherein
$R^1$ is hydrogen or methyl;
$R^2$ and $R^3$ are lower alkyl;
$R^4$ is $-C\equiv CR^5$ or

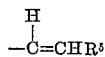

and
$R^5$ is hydrogen or methyl.

"Lower alkyl" as it is used in this specification represents ethyl, methyl, n-propyl, and isopropyl.

Compounds of the present invention can be illustratively:

N-isopropyl-N-(1-isopropyl-2-propynyl)-3,4,5-trimethoxycinnamamide
N-ethyl-3,4,5-trimethoxy-N-(1-methyl-2-propynyl)-cinnamamide
N-isopropyl-3,4,5-trimethoxy-N-(1-n-propyl-2-propynyl) cinnamamide
N-(1-ethyl-2-propynyl)-3,4,5,-trimethoxy-N-n-propylcinnamamide
N-(1-ethyl-2-butynyl)-3,4,5-trimethoxy-N-methyl-cinnamamide
N-(1-ethyl-2-propenyl)-3,4,5-trimethoxy-N-n-propylcinnamamide
N-ethyl-N-3,4,5-trimethoxy-β-methyl-N-(1-methyl-2-propenyl)cinnamamide
N-(1-isopropyl-2-propenyl)-3,4,5-trimethoxy-β,N-dimethylcinnamamide
and the like.

Compounds of the present invention can be prepared from the readily available substituted cinnamic acids, or the β-methyl derivatives thereof, and acetylenic amines or their semi-reduction products, by methods well known in the art.

Preparation of the β-methyl-3,4,5-trimethoxycinnamic acid and the N-substituted amide derived therefrom can be readily accomplished proceeding from any one of a number of available reagents. For example, gallic acid (3,4,5-trihydroxybenzoic acid) can be used as a convenient starting material for the synthesis. As the first step, trimethylgallic acid is prepared by methylating gallic acid with dimethyl sulfate under basic conditions (Organic Syntheses, Collective Volume I, 537 (1941)). In the second step, trimethylgallic acid is refluxed with an excess of thionyl chloride to produce trimethylgalloyl chloride, which is optionally separated from the reaction product mixture in a conventional manner. Diethyl malonate and trimethylgalloyl chloride are then reacted in the presence of magnesium ethylate to yield diethyl 3,4,5-trimethoxybenzoylmalonate. This ester is hydrolyzed and decarboxylated by refluxing with a mixture of glacial acetic acid and concentrated sulfuric acid to yield 3,4,5-trimethoxyacetophenone (Organic Syntheses, Collective Volume IV, 708 (1963)), an intermediate useful for synthesizing the β-methyl compounds of the invention.

The substituted ketone available by the above procedure is used to prepare the β-methyl-3,4,5-trimethoxycinnamic acid. One method of preparation is the aldol condensation procedure of Dunnavant and Hauser, J. Org. Chem., 25, 506 (1960). The synthesis is carried out in the following manner. To a stirred suspension of lithium amide in anhydrous liquid ammonia is added a solution of ethyl acetate in ether, stirring being continued thereafter for about 20 minutes. The substituted ketone is then added in a period of about one minute and the reaction mixture stirred for about an hour. The reaction product mixture is worked up by neutralizing with solid ammonium chloride and gradually replacing the liquid ammonia with ether. When the replacement is complete, cold water is added, and the ether layer containing the crude product is separated and washed successively with dilute mineral acid, dilute sodium bicarbonate solution, and water to remove impurities and undesired by-products. The ether solution is dried, the solvent removed in vacuo, and the residue distilled at reduced pressure to yield an ester, ethyl β-methyl-β-hydroxy-3,4,5-trimethoxydihydrocinnamate. This ester is dehydrated by refluxing with acetic anhydride, anhydrous formic acid, a mixture of acetic anhydride and acetyl chloride, or a like dehydrating agent. The unsaturated ester thus obtained, ethyl β-methyl-3,4,5-trimethoxycinnamate, is hydrolyzed by refluxing with a strong base in aqueous-ethanol solution. Strong bases suitable for accomplishing this hydrolysis include sodium hydroxide, potassium hydroxide, and the like. The hydrolysis mixture is then acidified with aqueous mineral acid to precipitate the β-methyl-3,4,5-trimethoxycinnamic acid, which is conveniently recrystallized from a mixture of benzene and petroleum ether.

Another method of synthesizing the substituted cinnamic acid is by the well-known Reformatsky reaction (Shriner, Org. Reactions, 1, 1 (1942)). In this method a mixture of activated zinc and anhydrous tetrahydrofuran is stirred and brought to reflux and a solution of ethyl bromoacetate and substituted ketone in a mixture of equal volumes of dry benzene and tetrahydrofuran is added at such a rate as to maintain a good rate of reflux. After the addition is complete and the reaction mixture has refluxed for an hour, it is cooled and an excess of saturated ammonium chloride solution is added. The mixture, which partly solidifies, is extracted with ether several times and the ether extracts washed with water and dried. The dried solution is distilled in vacuo to yield the ester, ethyl β-methyl-β-hydroxy-3,4,5-trimethoxydihydrocinnamate. The ester is dehydrated and hydrolyzed in the same manner as described previously to yield the β-methyl-3,4,5-trimethoxycinnamic acid.

A third method of preparing the β-methyl-3,4,5-trimethoxycinnamic acid is by the use of the phosphonate carbanion technique of Wadsworth and Emmons, J. Am. Chem. Soc., 83, 1737 (1961), in which phosphonate carbanions containing electron-withdrawing groups are reacted with ketones in an aprotic solvent.

Illustratively, a mixture of triethyl phosphonoacetate and sodium hydride (50 percent dispersion in mineral oil)

is stirred and reacted in a suitable inert solvent, preferably 1,2-dimethoxyethane, at room temperature until hydrogen gas ceases to be evolved. Suitable solvents include those in which the solvent molecules possess no reactive and replaceable hydrogen atoms. To the resulting mixture is added a solution of 3,4,5-trimethoxyacetophenone, preferably in the same solvent, and the mixture is stirred for a time sufficient to allow the reaction to go to completion. The ester formed in this manner, ethyl β-methyl-3,4,5-trimethoxycinnamate, is hydrolyzed and the free acid is recovered as set forth above.

The N-substituted cinnamamides are synthesized from the cinnamic acid prepared by any of the foregoing procedures. In a preferred embodiment the cinnamic acid chloride and an excess of 3-methylamino-1-butyne are dissolved in benzene and allowed to react overnight at about room temperature. The excess of 3-methylamino-1-butyne acts as an acid acceptor, and neutralizes the hydrogen chloride formed during the reaction. Suitable diluents, in addition to benzene, include ether, acetone, ethyl acetate, benzene-dimethylacetamide, and similar solvents which are unreactive toward the reactants and the end product. When the reaction is complete, the reaction product solution is washed with water and dried. The benzene diluent is removed in vacuo and the residue is recrystallized from a suitable solvent such as a mixture of benzene and petroleum ether.

The amines can be prepared by the method of G. F. Hennion and J. J. Sheehan, J. Am. Chem. Soc., 71, 1964 (1949), and of G. F. Hennion and J. M. Campbell, J. Org. Chem., 21, 791 (1956). These methods involve the reaction of sodium acetylide with an appropriately substituted aldehyde, replacement of the hydroxylic function of the resulting carbinol with chlorine or bromine, using, for example, thionyl chloride, phosphorus oxychloride, or phosphorus tribromide, and subsequent replacement of the halo function with an appropriately substituted amine and semi-reduction of the acetylenic amine with hydrogen in the presence of palladium 5 percent on carbon to give the ethylenic amine by the following outlined reaction scheme.

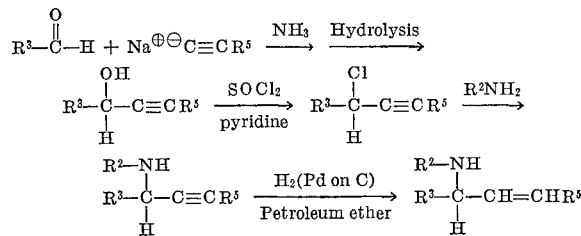

The method of choice, as shown, is with thionyl chloride in the presence of pyridine to avoid implementing the allene-acetylene rearrangements as discussed in Johnson, Acetylenic Compounds, Edward Arnold and Company, London, 1946, vol. I, p. 63.

New compounds prepared by the above method include 3-methylamino-1-butyne, boiling point 88° C., 740 mm., $n_D^{25}$ 1.4280; and 3-methylamino-1-butene, identified as the hydrochloride salt, M.P. 109–111° C.

*Analysis.*—Calcd. for $C_5H_{12}NCl$: C, 49.37; H, 9.94; N, 11.52. Found: C, 49.45; H, 10.03; N, 11.25.

The new cinnamamides of the present invention have unique, unexpected, and highly desirable tranquilizing properties, while at the same time they lack the usually concomitant and undesirable muscle flaccidity-causing and general body-relaxing property shown by other tranquilizing drugs. The neurosedative properties of the subject compounds have been demonstrated by tests in male rats made aggressive and hyperirritable by mechanical ablation of the septum. When treated with these drugs, such test animals lose their aggressiveness and responsiveness to irritating sensory stimuli.

This behavioral pattern is tested by the use of seven different sensory stimulations: (1) startle reaction to a loud handclap; (2) startle reaction to a puff of air on the back of the neck; (3) attempting to bite an object in contact with the fur on the side of the neck; (4) biting an object approaching its nose or held near its nose; (5) following or biting an object moved about in contact with its whiskers; (6) following or biting an object moved in front of its nose; (7) hopping and attempting to bite an object rubbed on the back adjacent to the tail. A rating of zero, 1, or 2 is given on each of these stimulatory factors, an untreated animal (one with a septal ablation) having a summation of these factors (emotionality) near or equal to 14. When these animals are treated with a tranquilizing drug of the type represented by the compounds of this invention, their emotionality becomes more nearly normal (nearer to 0). An index of emotionality is conveniently calculated in terms of the ratio of emotionality of treated animals over the emotionality of the same animals prior to treatment, this being a fractional number less than one. The smaller the index, the greater the activity of the compound. If this number is then subtracted from 1, the new resulting number, designated conventionally as P, is a number which represents the nearness to a normal state ($P=1$) caused by treatment with the compound. Measurements of emotionality are made at intervals following treatment up to and including 300 minutes, and the P values existing at such intervals are calculated therefrom, the P value for any particular measurement at time T being calculated from the formula $$1 = \frac{\text{emotionality of the treated animals}}{\text{emotionality of the same animals prior to treatment}}$$

An average value for P over the entire 300-minute period is conventionally designated as E. Both the P value to indicate degree of approach to normal emotionality at time T and the E value to indicate the average degree of control over the 300-minute test period are needed to completely characterize the effect of the drug. For example, a drug with a slow onset of action and long duration of action will have a low E value but a high P value at 180 or 300 minutes. In contrast, a short acting drug with a rapid onset of action will have a high E value and high P values below 180 minutes.

In the following table, the efficacy of the compounds of this invention has been demonstrated. The dosages given are in mg. of drug per kg. of animal weight and are indicated as either IP meaning intraperitoneally, or PO indicating that the dose was administered orally by gavage. The P values are reported for 30, 60, 90, 120, and 180 minutes; and the E values are shown for the 300 minute test period.

| $R^1$ | $R^2$ | $R^3$ | $R^4$ | Dose and Route | P at Time T (in minutes) | | | | | |
|---|---|---|---|---|---|---|---|---|---|---|
| | | | | | 30 | 60 | 90 | 120 | 180 | E |
| —H | —CH₃ | —CH₃ | —C≡CH | 40 IP | 0.69 | 0.77 | 0.65 | 0.60 | 0.36 | 0.60 |
| | | | | 40 PO | 0.33 | 0.43 | 0.59 | 0.46 | 0.43 | 0.45 |
| | | | | 80 PO | 0.49 | 0.72 | 0.68 | 0.51 | 0.65 | 0.60 |
| —CH₃ | —CH₃ | —CH₃ | —C≡CH | 40 IP | 0.66 | 0.71 | 0.60 | 0.34 | 0 | 0.29 |
| | | | | 40 PO | 0.14 | 0.14 | 0.17 | 0.06 | 0 | 0.08 |
| | | | | 80 PO | 0.59 | 0.81 | 0.89 | 0.86 | 0.73 | 80 |
| —H | —CH₃ | —CH₃ | —CH=CH₂ | 40 IP | 0.63 | 0.13 | <0 | 0.03 | 0.05 | 0.10 |
| | | | | 40 PO | 0.13 | 0.03 | 0 | 0 | 0.03 | 0.02 |
| | | | | 80 PO | 0.75 | 0.80 | 0.60 | 0.40 | 0.22 | 0.49 |

It will be seen from the table that the compounds of this invention reduced the emotionality of the animals greatly at about 80 mg./kg. orally.

The neurosedative properties of the subject compounds makes them highly useful in human and veterinary medicine. The lack of effect upon locomotion is a decided advantage when the compounds are used in the alleviation of anxiety syndrome, which is a common occurrence in mentally disrupted persons. They can also be used prior to operative surgery to calm an anxious patient. In the veterinary field they can be used preoperatively in injured animals; to alleviate anxiety when transporting animals (a common malady called shipping sickness); and to calm animals during close confinement as in veterinary pens or cages.

The following examples are presented to describe the invention more clearly, but are not to be construed as exclusive embodiments thereof.

EXAMPLE I

One hundred eighty-five grams of 52 percent sodium hydride in mineral oil was dispersed in 3350 ml. of ethylene glycol dimethyl ether. The suspension was then cooled in a salt-ice bath and treated dropwise with 905 g. of triethyl phosphonoacetate, keeping the temperature well below 20° C. After the addition was complete, the solution was allowed to warm to room temperature and stirred gently for 16 hours under a blanket of nitrogen.

3,4,5-trimethoxyacetophenone, 840 g. in 2520 ml. of ethylene glycol dimethyl ether, was then added rapidly. The resulting solution was stirred gently for three days at room temperature; then diluted with 10 liters of water, extracted into ether, and the ether dried and evaporated in vacuo to obtain a crude mixture of ethyl β-methyl-3,4,5-trimethoxycinnamic acid and mineral oil.

Potassium hydroxide pellets (2350 g.) were dissolved in 3560 ml. of water and 3560 ml. of ethanol. The crude ester-mineral oil mixture was added and the mixture was heated at reflux for 16 hours. The liquid was removed by distillation under vacuum to obtain a solid-salt cake. The solid was dispersed in a minimum of water and washed two times with an equal volume of ether. The resulting aqueous solution was cooled and acidified with concentrated hydrochloric acid. The product thus precipitated was removed by filtration and air dried. Yield: 2075 g. Melting point: 153.5–154.5° C.

Analysis.—Calcd.: C, 61.89; H, 6.39. Found: C, 61.75; H, 6.47.

EXAMPLE II

Five grams (0.021 mole) of 3,4,5-trimethoxycinnamic acid were dissolved in 50 ml. of dry benzene,( and 6.7 g. (0.0528 mole) of oxalyl chloride were added. The reaction mixture was refluxed until evolution of hydrogen chloride gas ceased, after which it was stripped of solvents in vacuo. The residue was taken up in 25 ml. of dimethylacetamide and added dropwise to a stirred solution of 50 ml. of dimethylacetamide containing 1.72 g. (0.021 mole) of 3-methylamino-1-butyne and 2.1 g. (0.021 mole) of triethylamine. The reaction mixture was stirred under reflux for 3 hours, then cooled to room temperature.

The reaction product mixture thus obtained was poured into a large volume of water and the resultant solution extracted twice with ether. The ether extracts were combined and washed in turn with saturated NaHCO$_3$ solution, 6 N HCl, and water. The ether layer was finally decolorized with carbon, filtered, dried, and the ether evaporated. The residue was taken up in a small amount of benzene and diluted to slight turbidity with petroleum ether. Chilling the solution yielded the crystalline product, 3,4,5 - trimethoxy-N-methyl-N-(1-methyl - 2 - propynyl)-cinnamamide, M.P. 82–84° C.

Analysis.—Calcd. for C$_{17}$H$_{21}$NO$_4$: C, 67.31; H, 6.97; N, 4.61. Found: C, 67.15; H, 7.15; N, 4.93.

Also prepared by the above procedure are the following compounds:

β,N-dimethyl - N - (1 - methyl-2-propynyl) - 3,4,5-trimethoxycinnamamide.

Melting point: 77–80° C.

Analysis.—Calcd. for C$_{18}$H$_{23}$NO$_4$: C, 68.11; H, 7.30; N, 4.41. Found: C, 67.83; H, 7.49; N, 4.48.

3,4,5-trimethoxy - N - methyl - N - (1 - methyl-2-propenyl)-cinnamamide.

Melting point: 77–89° C.

Analysis.—Calcd. for C$_{17}$H$_{23}$NO$_4$: C, 66.86; H, 7.59; N, 4.59. Found: C, 66.65; H, 7.74; N, 4.30.

I claim:

1. A compound of the formula

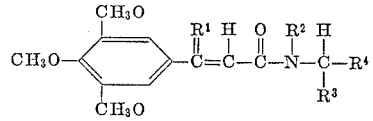

wherein

R$^1$ is hydrogen or methyl;
R$^2$ and R$^3$ are lower alkyl;
R$^4$ is —C≡CR$^5$; and
R$^5$ is hydrogen or methyl.

2. A compound as in claim 1, said compound being 3,4,5 - trimethoxy-N-methyl-N-(1-methyl-2-propynyl)cinnamamide.

3. A compound as in claim 1, said compound being β,N - dimethyl-N-(1 - methyl-2-propynyl) - 3,4,5-trimethoxycinnamamide.

References Cited

UNITED STATES PATENTS 3,133,964   5/1964   Horrom _____ 260—559

FOREIGN PATENTS 906,319   9/1962   Great Britain.

HENRY R. JILES, *Primary Examiner.*

N. J. TROUSOF, *Assistant Examiner.*

U.S. Cl. X.R.

260—473, 521, 544, 583, 592, 617, 654; 424—324